US009886338B1

(12) United States Patent
Khokhar et al.

(10) Patent No.: US 9,886,338 B1
(45) Date of Patent: Feb. 6, 2018

(54) HEALTH CHECK SOLUTION EVALUATING SYSTEM STATUS

(71) Applicant: EMC Corporation, Hopinkton, MA (US)

(72) Inventors: Muzhar Khokhar, Shrewsbury, MA (US); Ankita Pawar, Princeton, NJ (US); Chau Phan, Loganville, GA (US); Joseph Bet-Eivazi, Methuen, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 111 days.

(21) Appl. No.: 14/871,949

(22) Filed: Sep. 30, 2015

(51) Int. Cl.
G06F 11/07 (2006.01)

(52) U.S. Cl.
CPC ........ G06F 11/079 (2013.01); G06F 11/0751 (2013.01); G06F 11/0787 (2013.01)

(58) Field of Classification Search
USPC ......................................................... 714/47.3
See application file for complete search history.

(56) References Cited

U.S. PATENT DOCUMENTS

| 7,279,856 | B1 |   | 10/2007 | Sullivan et al. |            |
|-----------|----|---|---------|-----------------|------------|
| 8,006,116 | B1 | * | 8/2011  | Sobel ..........  | G06F 11/076 |
|           |    |   |         |                 | 711/162    |
| 8,131,842 | B1 | * | 3/2012  | Barth ..........  | H04L 12/413 |
|           |    |   |         |                 | 709/224    |
| 8,874,705 | B1 | * | 10/2014 | Satish ..........  | G06F 11/008 |
|           |    |   |         |                 | 709/220    |
| 8,949,187 | B1 | * | 2/2015  | Satish ..........  | G06F 11/1461 |
|           |    |   |         |                 | 707/640    |
| 8,949,669 | B1 | * | 2/2015  | Khokhar ........  | G06F 11/0727 |
|           |    |   |         |                 | 714/26     |
| 8,990,639 | B1 | * | 3/2015  | Marr ..........   | G06F 11/30 |
|           |    |   |         |                 | 714/25     |
| 9,009,542 | B1 | * | 4/2015  | Marr ..........   | G06F 11/3006 |
|           |    |   |         |                 | 714/47.1   |
| 9,043,658 | B1 | * | 5/2015  | Marr ..........   | G06F 12/14 |
|           |    |   |         |                 | 702/182    |
| 9,164,864 | B1 |   | 10/2015 | Novick et al.   |            |
| 9,213,727 | B1 | * | 12/2015 | Esposito .......  | G06F 17/30306 |
| 2005/0021733 | A1 | * | 1/2005 | Clinton ........  | G06F 11/008 |
|           |    |   |         |                 | 709/224    |
| 2006/0095662 | A1 | * | 5/2006 | Arnott ........   | G06F 3/04847 |
|           |    |   |         |                 | 711/114    |

(Continued)

Primary Examiner — Kamini Patel
(74) Attorney, Agent, or Firm — BainwoodHuang

(57) ABSTRACT

Examples are generally directed towards a health check analysis for computing systems. On receiving health check data associated with a computing system, a health check server analyzes the health check data using a set of parameters to generate a health score and/or a status indicator for the computing system. The health check data includes performance data for a plurality of components of the computing system and/or configuration data for the plurality of components of the computing system. The health score ranks performance of the computing system relative to a scale. The status indicator identifies a health status of the computing system. A status indicator includes a normal status, a warning status, or a critical status. The server returns the health score and/or the status indicator to the user device for presentation to a user.

16 Claims, 12 Drawing Sheets

(56) References Cited

U.S. PATENT DOCUMENTS

| | | | | |
|---|---|---|---|---|
| 2008/0263401 A1* | 10/2008 | Stenzel | ............... | G06F 11/3495 |
| | | | | 714/31 |
| 2014/0025414 A1* | 1/2014 | Worden | ................ | G06Q 10/06 |
| | | | | 705/7.12 |
| 2015/0066578 A1* | 3/2015 | Manocchia | ......... | G06F 19/3431 |
| | | | | 705/7.28 |
| 2015/0200824 A1* | 7/2015 | Sadovsky | ........... | H04L 43/0817 |
| | | | | 709/224 |
| 2016/0088006 A1* | 3/2016 | Gupta | .................... | H04L 43/08 |
| | | | | 726/23 |
| 2016/0378615 A1* | 12/2016 | Cohen | ................ | G06F 11/1469 |
| | | | | 714/19 |

* cited by examiner

1ST TIER CONSTANT HIGH SCORE

2ND TIER FLUCTUATING SCORE

3RD TIER CONSTANT LOW SCORE

HEALTH CHECK SOLUTION EVALUATING SYSTEM STATUS

BACKGROUND

A computing system typically includes a variety of hardware and software components, such as, but not limited to, processors, hard disks, flash drives, memory, network cards, ports, logical drives, pools, logical units (LUNs), file systems, as well as other components. The health and performance of each component within the system frequently influences the overall system health. A user may be able to obtain performance data for a single component of the system. However, users are frequently unable to quickly and efficiently obtain an indicator of overall system health.

In some situations, performance information for multiple components may be available in a static heat map. However, a heat map only provides performance data for represented components at a single point in time. A static heat map does not provide an indicator of overall system health.

A user may attempt to manually gather performance data or configuration for system components from multiple sources for manual analysis to determine system health. However, this would be a time intensive, painstaking, tedious, laborious, and inefficient process for users. Moreover, such manual analysis would frequently yield inaccurate or incomplete results leading to unrecognized, undiagnosed, and/or unresolved performance problems within the system.

SUMMARY

Examples of the disclosure provide a health check analysis. In an example, a health check server analyzes health check data associated with a computing system on receiving the health check data. The health check data includes performance data for a plurality of components associated with the computing system. The health check server generates a system health score and a status indicator for the computing system based on analysis of the health check data. The system health score ranks performance of the computing system based on a scale. The status indicator indicates a health status of the computing system. The health check server returns the generated health score and the status indicator to a user device for display to a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
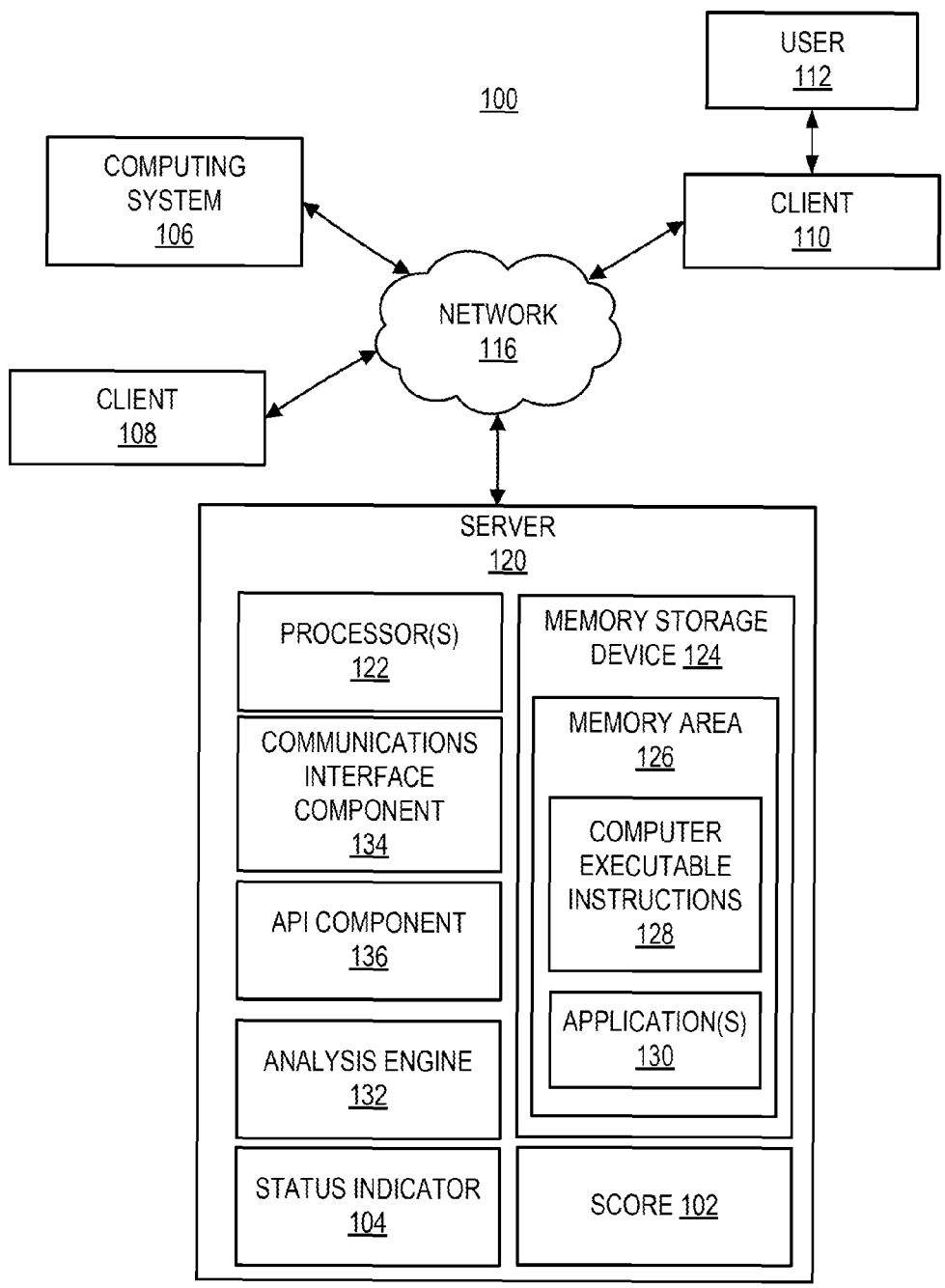
FIG. 1 is an exemplary block diagram illustrating a health check system.

Referring to the figures, some examples of the disclosure provide a health check system for generating a health score and/or a status indicator for one or more computing systems. Other examples of the disclosure provide a health check solution used by clients to verify the health status of their storage systems and/or verify the health of their datacenter.

Some aspects of the disclosure provide a mobile health check application on a client device associated with a user. The health check application enables users to initiate a health check on a remote computing system. A computing system may include a single computing device, a data storage system, a set of computing devices, or a set of data storage systems. A data storage system includes, without limitation, a set of one or more data storage devices and/or a set of one or more data storage arrays. In response, the health check application displays a health score and status indicator to the user in a display associated with the client device.

The health check application in some of the examples provides a user friendly, mobile application enabling a user to simply and efficiently monitor their computing systems for any performance issues remotely. This mobile health check application provides users with increased mobility, freedom, and peace of mind as they are able to quickly and conveniently obtain a health status for their remote systems.

In some non-limiting examples, the health check mechanism provides a one button check facility to initiate a health check. In other examples, the health check is initiated automatically based on a predetermined event, such as, but not limited to, a predetermined period of time. This enables a user to determine the performance status of a computing system in a more efficient and user-friendly manner.

Other examples of the disclosure provide a health check server that analyzes performance data and/or configuration data associated with a plurality of different computing system components to generate a single health score. The consolidation of performance data and configuration data analysis results into a single health score and/or status indicator increases the speed with which a user may obtain relevant and/or desired information regarding the health of a given computing system.

The health check server performs the health check analysis on a system that is separate from the client and the computing system that is being analyzed. This decouples the health check process from the client. Performing the health check analysis on the server further conserves memory and reduces processor load on the client.

In other examples, the health check server is a cloud server having a host component associated with software as a service (SaaS) cloud. The cloud server provides a health check component that is scalable and flexible due to the decoupled nature of the system. Moreover, separation of the cloud server from the client protects client arrays and improves reliability of the health check system.

The health score and status indicator generated by the health check server further enable a user to more efficiently identify problems associated with a computing system as a whole and/or problems associated with one or more specific components of a computing system, identifying problems associated with specific components, and identifying options for correcting those problems to improve the health of the computing system.

In some examples, the health score includes a recommendation identifying action to be taken by the user to improve the health score. The recommendation identifies one or more action(s) to mitigate the performance problems and improve the health score. In other words, the recommendation provides a mitigation plan to improve the system status and/or system score.

In other examples, the health check system generates a health history. The health history provides a history of health check scores for a particular computing system. The health history permits a user to discover trends in overall performance of a computing system over time with greater efficiency and accuracy to diagnose and/or correct recurring performance problems.

Further aspects of the disclosure store previous health scores in data storage associated with the health check server for easy and efficient retrieval by the health check system. This reduces network bandwidth usage and processor load by further reducing the number of queries and/or analysis of performance data performed by the health check analysis engine.

Additional aspects provide a health graph charting previous health scores for one or more computing devices. The health graph provides a user with insight on how a particular computing device, computing system, data storage array, or data center is deprecated over time during real world use before software and/or hardware upgrades become necessary. This health graph enables improved computing system design, dependability, reliability, reduced maintenance, and/or less frequent upgrades for these systems. The health graph information further support decisions relating to life span of computing systems to assist users in reducing costs associated with designing computing systems and improving efficiency in creation of computing systems.

Thus, the health check system reduces the error rate in designing systems and solving performance related problems associated with the systems. The health check further provides increased recognition of performance problems, as well as improved diagnosis and resolution of performance problems for improved overall computer system health, maintenance, and performance.

FIG. 1 is an exemplary block diagram illustrating a health check system. Health check system 100 is a system for performing a health check analysis on performance data and configuration data associated with a computing system to generate a health score 102 and/or a status indicator 104.

Performance data describes how a system is performing. The performance data includes data measuring or quantifying performance of hardware and/or software components of a computing system. Non-limiting examples of performance data includes log files and performance information, such as, but not limited to, information associated with latency, data transfer rate (throughput), disk rotations per minute (RPM), processor speed, processor utilization, temperature, bandwidth usage or traffic, capacity, queue length, cache hit ratio, memory usage, or any other data associated with the performance and function of a hardware or software component of a computing system.

Configuration data is data describing a system configuration of hardware and software components. The configuration data includes data describing a number of disk drives, drive vendor type, capacity, types of logical units (LUNs), identify drive firmware, redundant array of independent disks (RAID) group configuration, power supply, etc.

The health check analysis engine analyzes health check data to generate the health score 102 and/or the status indicator 104. The health check data includes performance data and configuration data for the computing system 106. The health score 102 ranks the health of the computing system 106 based on a scale. The term "health" refers to the overall performance, operational efficiency, and/or functionality of the computing system as a whole. In some examples, the health of the computing system is dependent on the performance and configuration of multiple different hardware and/or software components of the computing system.

For example, configuration data may be used by the health check analysis engine to determine if a computing system has an optimal or acceptable configuration. In some cases, a poor configuration or sub-optimal configuration may lead to a lower health score or lower status of the system. In some examples, the performance data describes how the system is performing. The configuration data provides insight into why the system is performing the way it is.

In some examples, the health score 102 is determined based on a set of parameters associated with one or more rules. For example, a parameter in the set of parameters may be a rule stating that each hard disk is checked to determine if the hard disk is functioning properly or if the hard disk has failed.

In some examples, if analysis of the health check data associated with the computing system indicates that each parameter in the set of parameters receives a passing score, the health score is a high score within a normal range. Health scores within a normal range indicate a functioning computing system operating within expected performance range(s), having no system performance issues, and/or negligible system performance issues.

If analysis of the performance data indicates that one or more parameters fail, then the health score 102 is lowered to a score within a warning range or a critical range. The health score indicates that the system is unhealthy, failing to meet performance expectations, experiencing performance problems or other issues. Moreover, if the system has problems, the score indicates the relative seriousness of the problems.

In one example, the score is raised or lowered in accordance with one or more weights associated with one or more parameters. For example, a disk fail parameter may be weighted higher and influence the health score 102 to a greater degree than a cache hit parameter having a lower weight because the cache hit rate does not affect the overall system performance as profoundly as a failed hard disk.

In other examples, the score ranks a system's health relative to one or more other computing systems. In other words, the one or more other computing systems are used as a reference for determining the overall health or performance of the computing system(s) undergoing the health check. In these examples, the score enables users to compare health across different computing systems.

In still other examples, the health score 102 provides a ranking of a computing system based on a set of threshold scores. For example, a score falling with a normal threshold range indicates a score within a normal range. A normal range includes a normal high threshold value and a normal low threshold value. Any score falling between the high and low threshold values within the normal range is a score within the normal threshold range. Likewise, a score falling within a critical range is a score within a critical threshold range.

In the example of FIG. 1, the health check system 100 performs a health check on one or more other computing devices, such as computing system 106. The computing system 106 in this example represents any type of computing device executing instructions (e.g., as application programs, operating system functionality, or both) to implement the operations and functionality associated with the computing system 106. The computing system 106 includes a plurality of hardware components and a plurality of software components.

The computing system 106 may be implemented as a data processing system, a data storage device, cloud storage, a personal computer, kiosk, tabletop device, industrial control device, wireless charging station, an electric automobile charging station, or any other type of computing device for which performance data is available. A data storage device is may include one or more hard disks, one or more flash drives, one or more data storage arrays, as well as any other type of device for storing data. Additionally, the computing system 106 may represent a group of processing units or a group of other computing devices.

A client, such as client 108 or client 110, initiates the health check on the computing system 106 by sending a request to a health check server, such as server 120. The client receives the health score 102 and/or the status indicator 104 in a response from the server 120. The health score 102 and status indicator 104 indicates the overall current health of the computing system 106 relative to one or more other comparable computing systems.

In this example, the client 110 is implemented as a computing device associated with a user 112. The client 110 is a separate computing device from computing system 106. In other words, the client 110 in some examples is located separately from or remotely to computing system 106. In other examples, the client 110 may be located locally to the server 120.

In some examples, client 110 is a portable computing device, such as, but without limitation, a smart phone, laptop, tablet, computing pad, netbook, gaming device, portable media player, or a wearable computing device, such as, without limitation, a smart watch. A portable computing device may also be referred to as a mobile computing device.

The client 110 optionally includes one or more processors and a memory storing computer executable instructions and/or one or more application(s). The application(s), when executed by the one or more processors, operate to perform functionality on the client 110. Exemplary application(s) include mail application programs, web browsers, calendar application programs, address book application programs, messaging programs, media applications, location-based services, search programs, and the like. The application(s) may communicate with counterpart applications or services such as web services accessible via a network 116. For example, the application(s) may represent downloaded client-side applications that correspond to server-side services executing in a cloud. In this example, the client 110 includes a health check application, such as, but without limitation, health check application 212 shown in FIG. 2 below.

The client 110 optionally includes a user interface component. In some examples, the user interface component includes a graphics card for displaying data to the user 112 and receiving data or commands from the user 112. The user interface component may also include computer-executable instructions (e.g., a driver) for operating the graphics card. Further, the user interface component may include a display (e.g., a touch screen display or natural user interface) and/or computer-executable instructions (e.g., a driver) for operating the display. In some examples, the user interface component is a graphical user interface (GUI). In other examples, the user interface component includes a browser.

The client 110 may also include one or more input/output device(s) (not shown) to provide data to the user 112 or receive data from the user 112. The input/output device(s) may include, without limitation, one or more speakers, a sound card, a camera, a microphone, a vibration motor, one or more accelerometers, a BLUETOOTH brand communication module, global positioning system (GPS) hardware, and a photoreceptive light sensor. For example, the user 112 may input commands or manipulate data by moving the client 110 in a particular way.

In other examples, the input/output device(s) include a display, such as a monitor, liquid crystal display (LCD), touch screen, plasma screen, image projection, holographic screen, holographic display, or any other type of visual display for displaying data, graphics and/or other images.

In this example, the client 110 sends a health check request to a server 120 to initiate the health check of the computing system 106. In some examples, the health check request may be transmitted by the client 110 to the server 120 via the network 116. In one example, the network 116 may be the Internet, intranet, Ethernet, or other wireless or hardwired connections by which the computing device 102 may send and receive data associated with one or more other computer systems, such as, but without limitation, client 110. However, other examples do not require a network 116.

In some examples, the client 110 does not initiate the health check request. Instead, the client 110 automatically sends health check data to the server 120 without user input or user initiation of the health check. The server 120 in this example automatically performs the health check and sends the score 102 and/or status indicator 104 to the client 110 without any user trigger or user interaction with the health check application and/or health check system.

In some examples, the health check is initiated automatically upon occurrence of an event, such as a predetermined period of time passed since the last health check was performance, a predetermined date, a predetermined time, receipt of health check data from the client 110, or any other predetermined event.

The server 120 includes one or more processor(s) 122 and a memory storage device 124 including a memory area 126. The processor(s) 122 include any quantity of processing units. In some examples, the one or more processor(s) 122 includes a central processing unit (CPU) "A" and a CPU "B". In other examples, the processor(s) 122 may include only a single processing unit, as well as three or more processing units.

The processor(s) 122 are programmed to execute computer-executable instructions 128 for implementing aspects of the disclosure. The instructions may be performed by a single processor or by multiple processors within the server 120, or performed by a processor external to the server 120. In some examples, the processor(s) 122 are programmed to execute instructions such as those illustrated in the figures (e.g., FIG. 10 and FIG. 11). The computer executable instructions 128 may also be referred to as computer executable program code.

In some examples, the processor(s) 122 represent an implementation of analog techniques to perform the operations described herein. For example, the operations may be performed by an analog computing device and/or a digital computing device.

The server 120 further has one or more computer readable media such as memory area 126 associated with memory storage device 124. The memory area 126 includes any quantity of media associated with or accessible by the server 120.

The memory storage device 124 may be internal to the server 120 (as shown in FIG. 1), external to the server 120 (not shown), or both (not shown). In some examples, the memory storage device 124 includes, for example, but without limitation, random access memory (RAM), read-only memory (ROM) and/or memory wired into an analog computing device. The memory storage device stores, among other data, one or more application(s) 130. The application(s) 130, when executed by the processor(s) 122, operate to perform functionality on the server 120.

The memory storage device 124 further stores one or more computer-executable components. Exemplary components include an analysis engine 132. In some examples, the analysis engine 132 component, when executed by the processor(s) 122 of the server 120, causes the processor(s) 122 to analyze health check data received from the computing system 106 to generate a health score 102 and/or a status indicator 104 for the computing system 106.

In some examples, the server 120 optionally includes a communications interface component 134. The communications interface component 134 includes a network interface card and/or computer-executable instructions (e.g., a driver) for operating the network interface card. Communication between the server 120 and the computing system 106, the client 108, the client 110, and/or other computing systems devices may occur using any protocol or mechanism over any wired or wireless connection. In some examples, the communications interface component 134 is operable with short range communication technologies, such as by using near-field communication (NFC) tags.

In other examples, the server 120 includes an application programming interface (API) component 136. In some examples, the API component 136 is a Representational State Transfer (REST) API. A REST API follows and provides a client-server model, as shown in FIG. 1. A uniform interface separates clients from servers. This separation of concerns means that, for example, clients are not concerned with data storage, which remains internal to each server, so that the portability of client code is improved. Servers are not concerned with the user interface or user state, so that servers can be simpler and more scalable.

A REST API is stateless. Client context is not stored on the server between requests. Each request from a client contains all the information needed by the server to service the request. The necessary state to handle a particular request is contained within the request itself. The state may be included within the request as part of the URI, query-string parameters, body, or headers.

After the server processes the request, the appropriate state is returned back to the client via headers, status and/or the body of the response. In REST, the client includes all information that may be needed by the server to fulfill a particular request within the request message.

Applications and APIs conforming to the REST architecture may be referred to as a REST API. HTTP based REST APIs may include a base resource identifier (e.g., http://example.com/resources/), an Internet media type for the data, standard HTTP methods, hypertext links to reference state, and hypertext links to reference related resources. An Internet media type may include, for example but without limitation, hypertext markup language (HTML) or extensible markup language (XML). HTTP methods may include, without limitation, GET, PUT, POST, and DELETE. A REST API may also be compliant with the HTML standard.

In one example, a REST API may be used in connection with a data storage system. A request may be issued from the client to GET health check results associated with the data storage system from the health check server. In response, the server returns the health check results via one or more REST API responses.

In these non-limiting examples, the server 120 receives health check requests from the client 110 via the API component 136. The server 120 requests and receives performance data from the computing system 106 via the API component 136. The server 120 sends the health score 102 and/or the status indicator 104 to the client via the API component 136.

In this illustrative example, the health check system 100 includes a computing system 106. However, in other examples, the health check system 100 includes a data center. A data center includes one or more types of data storage devices, such as, for example, one or more rotating magnetic storage devices, one or more rotating optical storage devices, and/or one or more solid state drives (SSDs), such as a flash drive. For example, a data center may include one or more hard disk drives (HDD), one or more flash drives, optical disks, as well as one or more other types of data storage devices. In other examples, the data center includes a set of one or more data storage arrays. A data storage array may be, for example, a redundant array of inexpensive disks (RAID) array, an optical storage array, or any other type of data storage array.

Figure 2:
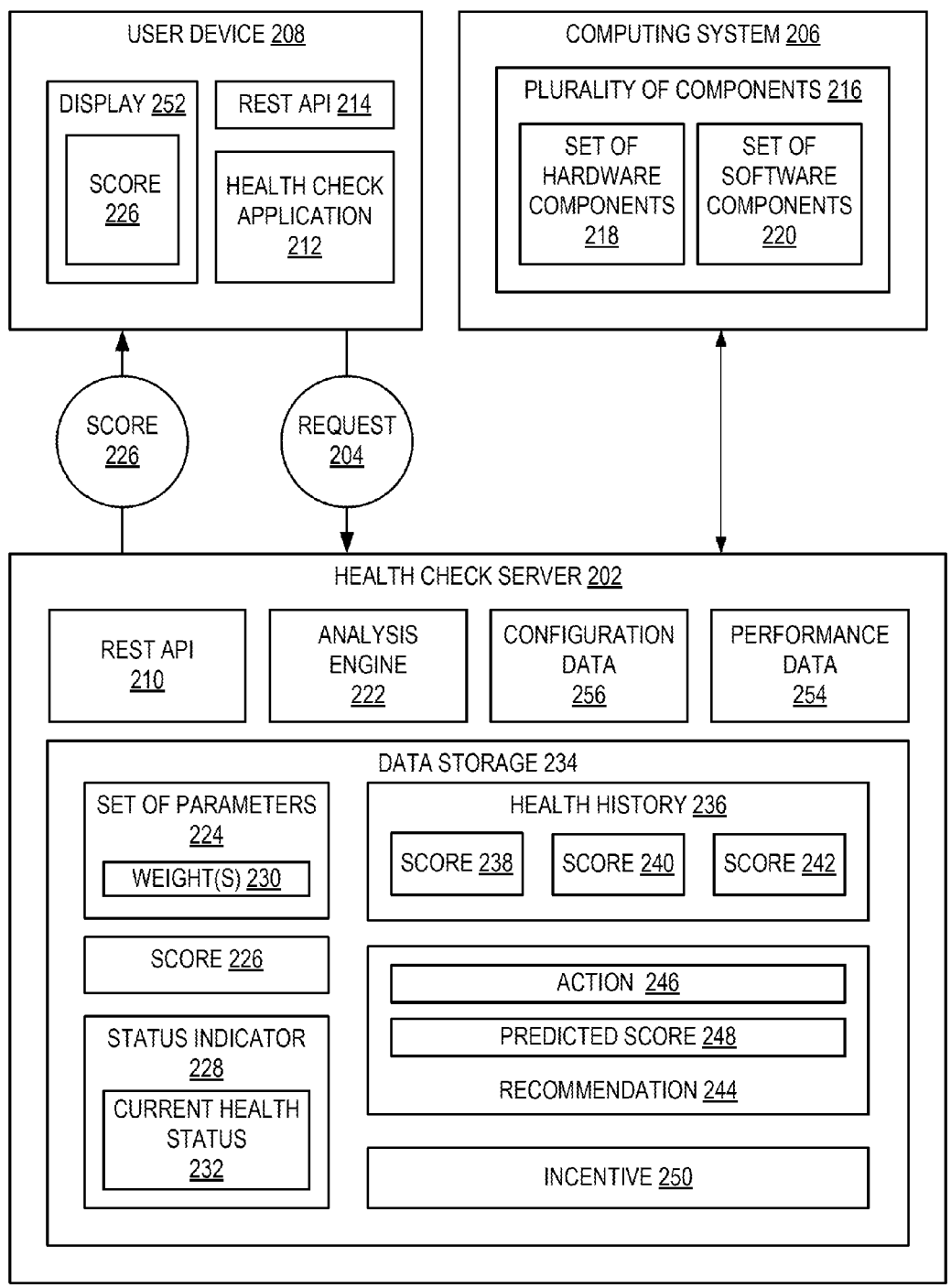
FIG. 2 is an exemplary block diagram illustrating a health check server performing a health check.

FIG. 2 is an exemplary block diagram illustrating a health check server performing a health check. Health check server 202 is any type of computing device for performing a health check on one or more computing devices to generate a health check score, status indicator, and/or a recommendation associated with the one or more computing devices. The health check server 202 may be a computing device, such as server 120 in FIG. 1. In this non-limiting example, the health check server 202 is a cloud server or application server providing software as a service to one or more clients. The health check server 202 may include one or more servers. In other words, the health check server 202 may include a group of two or more servers.

In this non-limiting example, the health check server 202 receives a request 204 to perform a health check on a computing system 206 from a user device 208 via an API, such as a REST API 210. The computing system 206 may include a single computing device, as well as two or more computing devices. The computing system 206 may be, for example, a desktop computer, one or more data storage arrays, one or more data storage devices, a computing device integrated into a vehicle or structure, a cloud storage system, a web server, a blade server, or any other type of computing device.

The user device 208 is a computing device associated with a user, such as, for example but without limitation, client 110 in FIG. 1. The user device 208 may be a mobile computing device, such as, but not limited to, a smart phone, a tablet, a laptop computing device, a smart watch or other wearable computing device.

The user device 208 in this example includes a health check application 212. The health check application 212 is a client end which resides on the user device 208. The health check application 212 in this example acts as a trigger point to initiate a health check on one or more remote systems and to consolidate health check results returned to the health check application 212. In some non-limiting examples, the health check application 212 may include a mobile health check application on a mobile computing device, such as a cellular telephone, tablet, or other mobile computing device.

In some examples, the health check application 212 provides a user interface to the user. The user may utilize the user interface to request the health check on one or more computing devices. In some examples, the user interface is a graphical user interface. In some examples, the health check application 212 provides a button, icon, or other input device associated with the user interface for initiating the health check. The user selects the button or other icon to select the health check option. This may be referred to as a one button check facility provided by the health check application 212. However, the examples are not limited to one button or icon to initiate the health check.

In this example, the request 204 is generated when the user selects a health check option in the health check application 212 to initiate a health check on a computing device, such as a data storage array or a data center. The user may select to initiate the health check by clicking on the icon or other selection means provided by the health check application 212. In the background, the request 204 is sent from the user device 208 to the health check server 202 which initiates the health check process with the computing system 206. In some examples, the user device 208 sends the request to the computing system 206 via a network connection, such as the Internet. The request in these examples may be sent using any application for sending, receiving, retrieving, or traversing data on the Internet and/or the World Wide Web (WWW), such as, but not limited to, a web browser, a cloud application, or any other type of application.

In this example, the user device 208 sends the request 204 via the API associated with the user device 208. The API may be implemented as any type of API library. In this example, the API is a REST API 214

In some examples, on receiving the request 204 for a health check on the computing system 206, the server requests performance data 254 and configuration data 256 for a plurality of components 216 associated with the computing system 206. The plurality of component 216 includes a set of one or more hardware components 218 and/or a set of one or more software components 220.

In some examples, the set of hardware components 218 includes hardware components such as, for example, but without limitation, one or more processor(s), one or more hard disks, one or more flash drive(s), one or more data storage arrays, one or more port(s), one or more cache(s), memory, network interface card (NIC), one or more pools, one or more fans, and/or any other hardware components associated with a computing system and having performance data 254 associated with it. A data storage array is a set of one or more data storage arrays, such as a RAID array. A port is a network port, such as, but without limitation, an Ethernet Port or a Fibre Channel (FC) port.

The set of software components 220 is a set of one or more applications or other software components. The plurality of components 216 may also optionally include one or more pools, one or more file systems, logical units (LUNs), or other components associated with computing system 206 for which performance data is available.

In this example, the health check server 202 sends a request for the performance data and configuration data describing the computing system 206 to the computing system 206 or to a host component running on the computing system 206. In some examples, the computing system is contacted using existing protocols, such as, but without limitation, EMC secure remote support (ESRS), virtual environment (VE), or any other type of protocols for contacting computing systems and/or data storage arrays.

In some non-limiting examples, the health check server 202 sends the request for the health check data via a network connection, such as a connection to the Internet, Ethernet, or other network. The server in some examples may send the request via a web browser, cloud application, or any other type of application for sending, receiving, retrieving, and/or traversing data on the Internet.

On receiving the request for the performance data, the computing system collects the requested health check data. The health check data includes at least one of performance data and configuration data associated with the computing system 206. The computing system 206 sends the health check data to the health check server 202. In some non-limiting examples, a health check data gathering component associated with the computing system 206 gathers and packages the health check data for transmission to the health check server 202.

In some examples, the health check data is packaged in a data transmission packaging format, such as, but without limitation, SPCollects. However, the examples are not limited to SPCollects. In other examples, other services and tools are utilized to gather and/or package the relevant performance data at the computing system for transmission to the health check server 202.

Health check server 202 includes an analysis engine 222. The analysis engine 222 evaluates the status of the computing system 206. In this example, the analysis engine 222 analyzes performance data 254 received from the computing system 206 using a set of parameters 224 and one or more weight(s) 230 to evaluate health of the computing system 206. The set of parameters 224 includes one or more parameters.

In other examples, the set of parameters 224 is a set of one or more rules and/or a set of one or more tests performed or applied during the analysis of performance data 254 and configuration data 256 to generate a score 226 and a status indicator 228 identifying a current health status 232 of the computing system 206.

In some examples, every parameter in the set of parameters 224 has an associated score. The health check server 202 generates the score 226 for the computing system 206 based on the analysis of the performance data using the set of parameters 224 and the associated scores and weights for the parameters applied during the health check analysis.

The health check analysis generates health check results. The health check results include one or more of the score 226, the status indicator 228, a health history 236, a recommendation 244, and/or an incentive 250. In other words, the results may include any combination of the score 226, the status indicator 228, the health history 236, the recommendation 244, and/or the incentive 250.

The health check server returns the health check results to the user device. In other examples, the health check server returns the health check results to one or more other computing devices. The health check server in some non-limiting examples sends the health check results via the network connection. The server in some examples sends the results via a web browser, cloud application, or any other type of application for sending, receiving, retrieving, and/or traversing data on the Internet.

The results returned to the user device 208 in some examples include only the score 226 or only the status indicator 228. In other examples, the results include the score 226 and the status indicator 228. In still other examples, the results include the score 226, the status indicator, and the health history 236. In yet other examples, the results include the score 226, the status indicator 228, the recommendation 244 and the incentive 250.

The score 226 is a health score indicating health or performance of the computing system relative to a scale. The score 226 may include one or more scores associated with one or more computing devices, computing systems, data storage arrays, and/or data storage devices.

The status indicator 228 provides a graphic indicator of the status of the computing system 206. The user device 208 displays the health of the system to the user in the form of the status indicator 228 and the score 226. The status indicator 228 is based on the set of parameters 224 obtained after the analysis engine 222 is run to analyze performance data 254 and configuration data 256.

The recommendation includes a suggestion or recommendation of an action 246 to be taken by the user with respect to the computing system 206. The action 246 to be taken is an action to correct a problem, mitigate a performance issue, and/or improve the health score 226.

In some examples, the health check server 202 generates the recommendation 244 on determining the score 226 indicates the health of the computing system 206 has fallen below a normal level. The health check server 202 determines whether the score 226 has fallen below a normal level based on a score, threshold, scale, or other gauge for comparing the current score to a normal range of scores. In these examples, the health check server 202 returns the score 226 with the recommendation 244 for display to the user.

In other examples, the health check server 202 generates the recommendation 244 if the generated status indicator 228 indicates a warning status or a critical status. In these examples, the health check server 202 returns the status indicator 228 with the recommendation 244 for display to the user.

In other examples, the recommendation 244 is always generated by the health check server 202. In these examples, the score 226 and/or the status indicator 228 always include the recommendation 244.

The recommendation 244 option shows the user how the user can improve their health score. The recommendation 244 suggests steps or other actions to be taken by the user to improve the current state of the computing system. For example, the recommendation may include suggestions to upgrade to a newer version of software, remove a faulty hard drive, replace a data storage device with a better quality storage device, repair a data storage array, or other action to improve the system health.

In another example, the score may be low, such as in a warning range, because there is an issue with drive firmware. In this example, the configuration data describes the number of drives and type of drive firmware. The recommendation may include a suggestion to update the drive firmware to improve functionality and increase the health score.

In another example, the configuration data may indicate that the system configuration is sub-optimal or otherwise contributing to a lowered health score and/or below normal status indicator. In this example, the recommendation may include a new or different system configuration to improve system performance and/or improve the health score and status.

The recommendation 244 optionally includes a predicted score 248. In this example, prediction is part of the health check analysis. The predicted score 248 is a predicted future health score for the computing system 206 if the user follows the recommendation and implements the action to be taken. The predicted score 248 in some examples includes a prediction of how the score can be improved by performing the recommended action and potential issues or future problems that may arise if the recommended action is not taken.

For example, if the score 226 falls below a normal level because a hard disk associated with the computing device has failed, the recommended action 246 to be taken in the recommendation 244 may include replacing the failed hard disk with a new hard disk. The predicted score 248 in this example indicates that if the user replaces the hard disk as recommended, the health score for the computing system 206 will return to a score within the normal range for the computing system 206. The predicted score 248 may also indicate that if the disk is not replaced, the score and system performance will continue to decline into the critical range. In some examples, the health check server 202 returns the predicted score with the recommendation 244 to the user device 208.

In other examples, the user may request a predicted score if a proposed action is taken. For example, the user may send a query to the health check server requesting a predicted health score if a particular data storage array is replaced with a better quality data storage array. In this case, the server returns a predicted health score indicating what the health status of the system is likely to be in the future if the proposed action to replace the data storage device is taken.

In another example, a user may request a predicted score if a particular software component is upgraded to a newer version. In this example, the health check server generates a predicted score based on the proposed action to upgrade software.

In still other examples, the predicted score 248 is automatically sent to the user device 208 with the score 226. In other examples, the score 226 always includes at least one predicted score without requiring a user to request a predicted score.

The incentive 250 is a score based incentive or status based incentive offered to a user for improving a health score, maintaining a particular score, receiving scores within a particular range of scores, improving a status of the system, and/or maintaining the status of the system at a particular level. The health check server 202 optionally generates the incentive 250 associated with a particular recommendation and/or predicted score. In other examples, the score 226 automatically includes at least one incentive.

Improving the health score may include increasing the health score to achieve a score within the normal score range and/or maintaining a health score that falls within a normal score range. The incentive may include pricing discounts, additional services or benefits, rewards, points, better service contract terms, subsidized service contract, or any other type of incentive for maintaining a particular score or maintaining a health score within a particular range.

Improving the status of the system may include changing a status from a warning status to a normal status, changing a critical status to a normal status, or changing a critical status to a warning status. Improving the status may also refer to maintaining a particular status. For example, a user may receive an incentive if the user maintains a normal status. In another example, the user may receive one or more incentives if status indicators for the system status never fall below a warning status.

The incentive in other examples may include benefits for implementing recommended actions to be taken to improve the health score. In other words, if a user will perform the recommended action 246 to be taken, the user will receive an incentive for improving the health score of their system or preventing the health score of their system from further declining. In still other examples, customer service contracts may include commitments by the user to maintain a particular score.

In some examples, the health check server 202 returns the score 226 and the status indicator 228 to the user device 208 via the REST API 210. The health check server 202 stores the score 226 and the status indicator 228 in a data storage 234.

The data storage 234 is any type of data storage. The data storage 234 may be, for example, a data structure or a database. In some examples, the data storage 234 may be located internal to the health check server 202 as shown in FIG. 2. In other examples, the data storage 234 is located externally to the health check server (not shown).

The health check server 202 stores previous health scores in the data storage 234 to form the health history 236 for the computing system 206. In this example, the health history 236 for the computing system 206 includes pervious score 238, score 240, and score 242. However, a health history is not limited to three previous health scores. The health history 236 may include any number of previous health scores, including a single previous health score, two previous health scores, as well as four or more previous health scores for the computing system 206.

In other examples, the health history 236 includes one or more previous status indicators. The status indicators provide trend information for changing status of the computing system over time.

In some examples, the health check server 202 returns the health history 236 with the score 226 in response to a request from the user device 208 for the health history. In other examples, the score includes the health history without requiring any additional request for health history from the user.

On receiving the health check results, the health check application 212 displays the health check results to the user. In this example, the health check application 212 presents the health check results to the user on display 252 of the user device 208. The health check results includes one or more of the score 226, the status indicator 228, health history 236, recommendation 244, incentive 250, as well as any other health related information returned to the health check application 212 associated with the user device 208 in response to the request 204 for the health check.

In this example, the display 252 is a display screen of the user device 208. However, the display 252 is not limited to a screen. The display 252 may include any means for displaying results to the user, such as a projected image, an auditory output, or any other information output.

In still other examples, the health check application 212 provides a help/support initiation control, such as a button, icon, or other input device, for initiating a call to support personnel. The call to support personnel includes, without limitation, a video call feature. The help/support initiation feature enables the user to contact support services or other help/support personnel to discuss issues identified with the score 226 and/or status indicator 228. In this example, in the event of issues, problems, or questions associated with the health check system and/or health check results, the user can reach support personnel at the click of an icon, button or other control associated with the user device 208. In this manner, the health check application 212 provides the health status indicator and score to the user with a help feature to enable users to contact support personnel if additional assistance or information is required.

In this non-limiting example, the health check server 202 generates both a score 226 and a status indicator 228. However, in other examples, the health check server 202 only generates the score 226 without generating a health status indicator. In still other examples, the health check server 202 generates a status indicator 228 without generating a health score.

In still other examples, the score 226 is used in comparative analysis across one or more other computing systems. The score for one computing system is compared to scores for one or more other similar computing systems and/or one or more other similar users to analyze performance of multiple different computing systems relative to one another. In some examples, the health check server receives health check data from these other computing systems and sends score(s) and indicator(s) to these other computing systems via a network connection to each of these other computing systems. The network connection may be any type of network connection, including an Internet connection, an Ethernet connection, or any other type of network.

In this non-limiting example, the health check is initiated by the user device 208 sending the request 204 to the health check server 202. However, in other examples, the health check server 202 automatically performs the health check without the user device 208 and/or the health check application 212 initiating the health check. In other words, the health check may be performed automatically without any trigger, button, icon, input device, or other user action required to initiate the health check.

In other words, the user device 208 in some examples does not send a request to initiate the health check. Instead, the computing system 206 automatically sends health check data to the health check server 202 on occurrence of a predetermined event, such as, but not limited to, a predetermined period of time, a date and/or time, or other event. Upon receiving the health check data, the health check server 202 automatically performs the health check and returns the health check results to the user device 208. The health check results includes one or more of the score 226, status indicator 228, recommendation 244, and/or incentive 250.

In other examples, the health check system includes a client portal where all systems belonging or associated with the user are listed. The health check server sends health check results notifying the user of the health of the computing system(s) automatically at predetermined intervals or upon occurrence of one or more predetermined events, such as receiving health check data from the computing systems.

In other examples, the computing system itself sends performance data and configuration data regarding the health of the computing system for analysis by the health check server 202. The health check server 202 automatically performs the health check analysis and returns the results to the user device automatically upon receiving the performance data and configuration data from the computing systems. The computing system in this example includes a data storage system, such as, but not limited to, a set of one or more data storage arrays.

Figure 3:
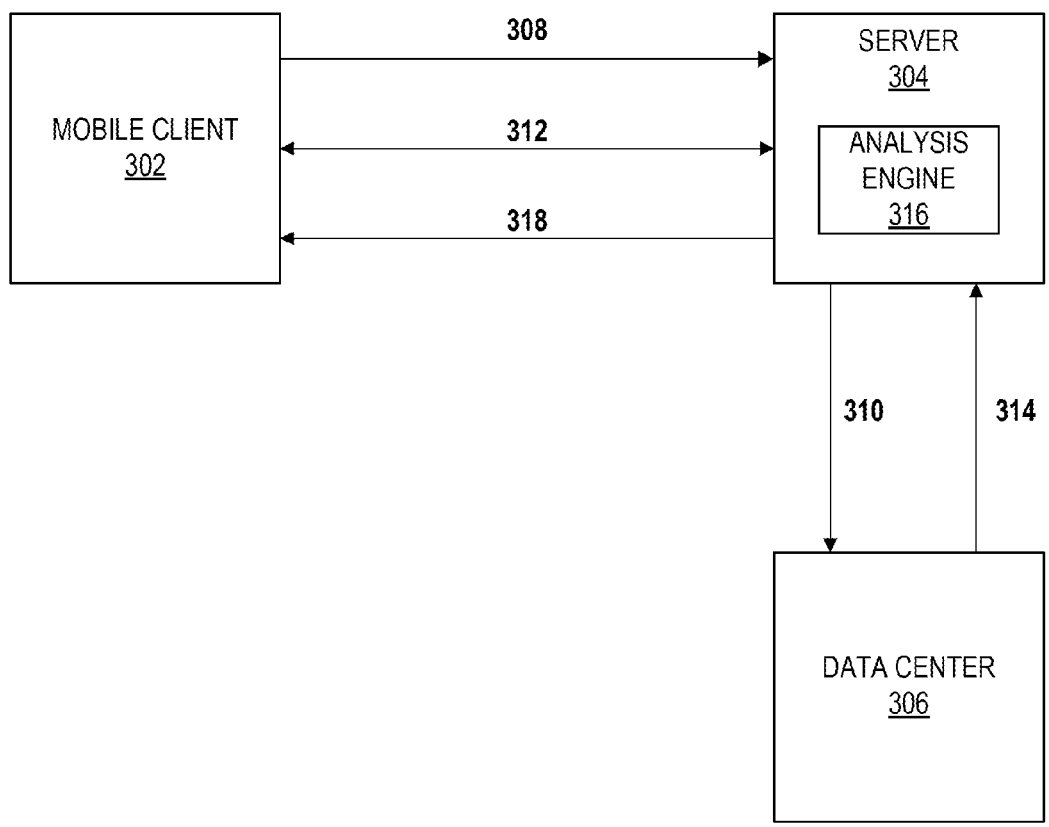
FIG. 3 is an exemplary block diagram illustrating transmission of health check requests and responses.

FIG. 3 is an exemplary block diagram illustrating transmission of health check requests and responses. A health check system 300 in this example includes a mobile client 302, a server 304, and a data center 306. The mobile client 302 is a client, such as client 110 in FIG. 1 and user device 205 in FIG. 2. The mobile client 302 in this example, is a user device running a health check application, such as, for example, a smart phone, a laptop, a tablet, or a wearable computing device. However, in other examples, the mobile client 302 is a web based application, a cloud based deployment, or other client.

In some examples, the server 304 is an SaaS cloud server. However, in other examples, the server 304 is not a server providing SaaS and is not associated with a cloud. In these examples, the server 304 is any type of computing device for generating the health check results. In other words, the server 304 may be implemented as any type of server, such as an application server, a web server, a cloud server, or any other type of server. The server 304 in this non-limiting example generates health check scores and status indicators associated with computing system(s) to one or more clients.

The data center 306 comprises one or more computing devices. The data center 306 in this non-limiting example includes one or more data storage arrays. In other examples, the data center 306 includes one or more data storage systems.

A request 308 is sent from the mobile client 302 to the server 304 in response to a user initiating a health check on one or more computing devices associated with the data center 306. The request 308 may include a request for a current health score, a status indicator, a health history, a recommendation, an incentive, a predicted score and/or a recommended action for one or more data storage devices associated the data center 306. The request 308 may also include a request for a current data center health score, a status indicator, a health history, a recommendation, an incentive, a predicted score and/or a recommended action for the data center as a whole.

The user initiates the health check via the health check application associated with the mobile client 302. On receiving the request, the server 304 initiates the health check process 314 by requesting health check data from the data center 306. The mobile client 302 receives a globally unique identifier (GUID) 312 in return and uses the GUID to poll the server 304 for results. The request is initiated in the SaaS cloud by adding the request for health check in a request table associated with the server 304.

The data center 306 optionally includes a host component. In some examples, the host component periodically polls the SaaS cloud for any incoming requests. In this example, the host component polls for incoming requests from the server by scanning the request table on the server 304 periodically for any new health check request for performance data.

When a new request is found in the request table, the host component triggers collection of performance data on the corresponding computing device in the data center which is the subject of the requested health check. In one example, the host component triggers collection of performance data by initiating a performance data gathering component. Once the collection of the performance data for the relevant computing device in the data center 306 is complete, the host component sends the health check data 314 to the server 304. The health check data 314 includes configuration data and/or performance data describing one or more data storage devices and/or one or more data storage arrays associated with the data center 306.

In this non-limiting example, the server 304 includes a REST API, a data repository, and an analysis engine 316. The analysis engine 316 analyzes the performance data to generate health check parameter test results and saves the parameter test results in the data repository. The data repository may be implemented as a database, data structure, or other data storage. Previous health check results are saved in the data repository. Thus, the server manages and maintains the previous health check results on the SaaS cloud. When the user associated with the mobile client 302 wants to view the health history data for a particular computing system, the mobile client 302 queries the server for the health history data.

In some examples, the analysis engine is implemented as an NGTRiiAGE software tool for mapping the current status and health of the system. In still other examples, other health related analysis components are integrated for additional health check information.

The health check parameters include a set of tests or rules applied during the health check analysis. The parameters may optionally include weights applied to one or more of the tests or rules. The health check results may be added to a health history for the corresponding computing device stored in the database.

The health check application associated with the mobile client 302 is notified of the health check completion and the mobile client 302 receives the health check results 318 from the server 304. The health check results may include one or more of a current health score, a status indicator, a health history, a recommendation, an incentive, a predicted score, a recommended action, a set of parameters, and/or other results information. The mobile client 302 displays the results to the user when the user clicks on the notification.

In this example, there is a single client, mobile client 302. However, in other examples, the health check server responds to health check requests received from multiple clients. In one non-limiting example, multiple clients verify health through their protocols. In some examples, the client(s) include Unisphere storage management tool and/or Unisphere service manager (USM) tools for managing data storage systems.

Figure 4:
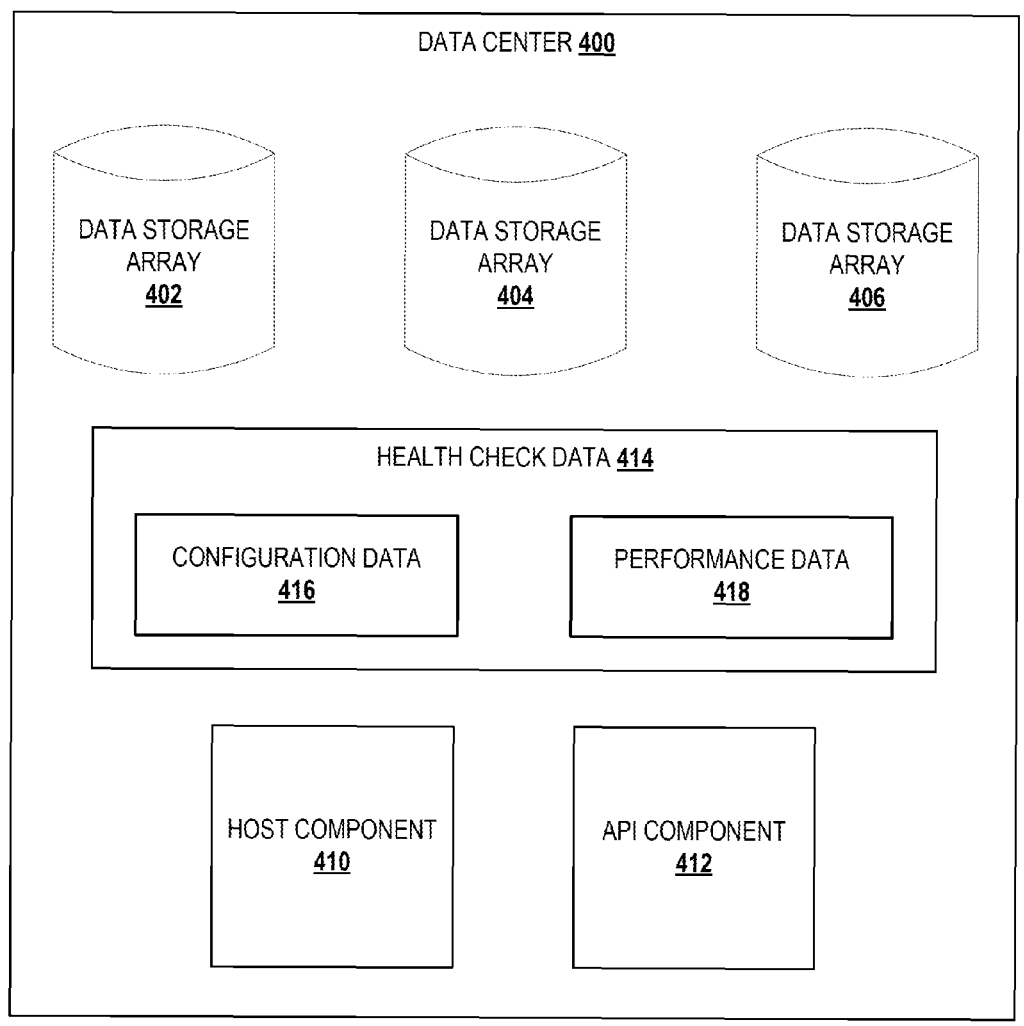
FIG. 4 is a block diagram illustrating a data center.

FIG. 4 is a block diagram illustrating a data center. The data center 400 includes a set of two or more computing devices, such as, but without limitation, computing system 106. In this example, the set of computing devices includes data storage array 402, data storage array 404, and data storage array 406.

Although this example shows three data storage arrays, the data center 400 may include any number of data storage arrays. For example, the data center 400 may include a single data storage array, two data storage arrays, as well as four or more data storage arrays. As used herein, a data storage array is a device including two or more data storage devices. In some examples, a data storage array is a RAID array. In other examples, a data storage array is a solid state data storage array.

A host component 410 associated with the data center 400 receives a health check request from a health check server. The health check request identifies one or more computing devices associated with the data center 400. The host component 410 gathers health check data 414 for the one or more identified computing devices and returns the health check data 414 to the health check server. The health check data 414 includes at least one or configuration data 416 and/or performance data 418. In other words, the health check data 414 may include configuration data only, performance data 418 only, or both configuration data 416 and performance data 418.

In some non-limiting examples, a health check data gathering component associated with the data center 400 gathers and packages the health check data 414. Any type of component for gathering and packaging requested data for transmission to the health check server may be utilized.

In this example, the host component 410 is a software component. In some examples, the host component 410 is a software component. In other examples, the host component 410 includes both software and hardware. In other words, the host component 410 may include hardware components for gathering the health check data 414 from one or more computing devices of the data center 400, such as sensors, monitors, etc.

In the example shown in FIG. 4, the data center 400 receives a request for health check data 414 for data storage array 404. In response to the request, the host component 410 gathers the health check data 414 associated with the data storage array 404 and packages the health check data 414 for transmission to the requesting health check server. The host component 410 then sends the health check data 414 to the health check server.

The server analyzes the health check data 414 for the data storage array to generate an array health score identifying the current health of this particular array associated with the data center. The array health score enables comparative analysis across different data storage arrays. In other words, a user may compare array health scores for each data storage array to compare health across different arrays.

In other examples, the host component 410 receives a request for health check data 414 associated with one or more computing devices. For example, the host component 410 may receive a request for health check data 414 associated with all the computing devices associated with the data center 400. In this example, the data center 400 includes four data storage arrays. The host component 410 gathers health check data 414 from data storage array 402, data storage array 404, data storage array 406, and data storage array 408. The host component 410 sends all the health check data 414 for all the data storage arrays, including data storage array 402, data storage array 404, and data storage array 406 to the health check server.

The health check server then generates a data center health score and/or a status indicator for all the data storage arrays associated with the data center 400. The data center health score reflects the current health of all the data storage arrays. The data center health score in some examples is used for comparative analysis to compare different data centers.

In some examples, the host component 410 sends the health check data 414 via an API component 412. The API component 412 may be implemented as any type of API, including, but without limitation, a REST API. However, the examples are not limited to sending the health check data 414 via an API. The health check data 414 may be transmitted to the health check server using any means or method for transferring data.

Figure 5:
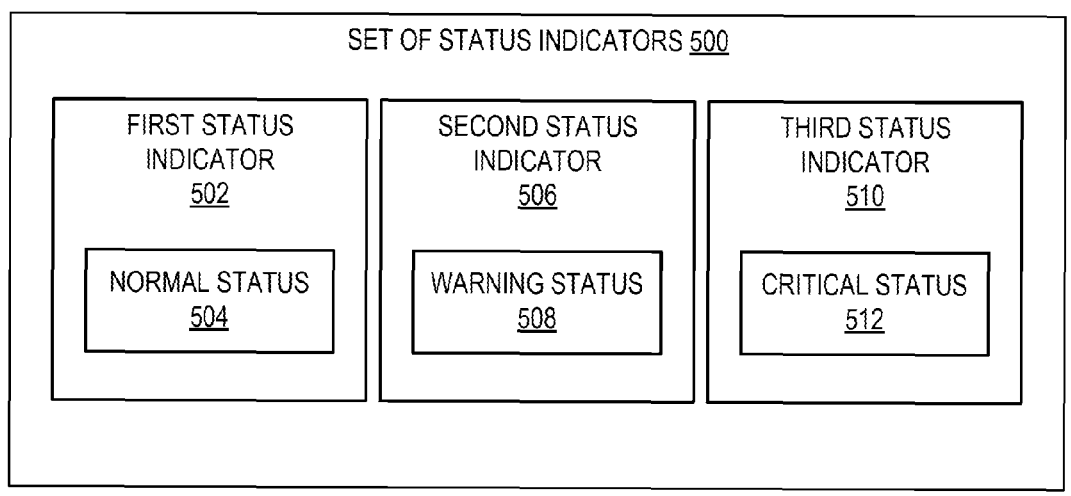
FIG. 5 is a block diagram illustrating a set of status indicators.

FIG. 5 is a block diagram illustrating a set of status indicators. The set of status indicators 500 includes one or more status indicators identifying a health status of one or more computing device(s). In this example, a status indicator is a visual or graphical indicator.

Different status indicators identify a different status of the computing device. For example, a first status indicator 502 identifies a normal status 504, a second status indicator 506 identifies a warning status 508, and a third status indicator 510 identifies a critical status 512 of the computing device.

The normal status 504 indicates the computing device is functioning as expected, as intended, or within normal standards for speed, efficiency, accuracy, operability, etc. In other words, normal status indicates the computing device is functioning or performing normally.

The warning status 508 indicates there are relatively minor problems with one or more software or hardware components of the computing device. The warning status 508 indicates that the computing device is functioning normally but one or more potential problems are likely to occur in the future. For example, the warning status may indicate that one or more hard disks should be replaced because it is likely that the one or more disks will fail in the future.

The critical status 512 indicates a current problem. In some examples, the critical status indicates serious issues that impair functioning of the computing device. The critical status 512 indicates there are existing problems or issues associated with the computing device that require correction, repair of one or more components, replacement of one or more components, or other action. For example, a critical status 512 may indicate one or more hard disks have failed.

This example in FIG. 5 shows three different status indicators identifying a normal status, warning status, and critical status. However, in other examples, the status indicators identify only two status states, normal and critical status.

In still other examples, the status indicators identify four or more different status states for a computing device. Likewise, the status states are not limited to "normal", "warning", and "critical" status identifiers. The status indicators may identify different status states having any type of status identifier. A status indicator may identify one or more of an optimal status, a good status, an acceptable status, an average status, a below average status, a sub-optimal status, a bad status, and/or a disabled status. In other examples, the status indicators may include status using an ordinal scale, such as a first status, a second status, a third status, a fourth status, etc.

A status indicator identifies the status of a computing device to a user by changing a feature of an icon or graphic of the status indicator, such as a shape, color, size, or other characteristic of an icon or other graphic when displayed to a user by a client. In some examples, a status indicator includes a color. The color indicators the current status and a change in the color indicates a change in the status of the computing device.

Each color of the status indicator identifies a different status. The status indicator may include any color, such as, but without limitation, a red color, an amber color, an orange color, a yellow color, a green color, a blue color, or any other color. In some examples, the status indicator is a green color to indicate normal status 504, a yellow color to indicate warning status 508, and a red color to indicate critical status.

In other examples, a status indicator uses different shapes or changing shapes of an icon to convey the status of the computing device. Any shape, icon, or graphic may be used for different status indicators.

For example, a check mark or smiley face shaped icon may indicate a normal status, a flag or triangle-shaped icon may indicate a warning status, while an exclamation point shaped icon may indicate a warning status. In other examples, a small icon may indicate a normal status. Enlarging the size, diameter, or circumference of the icon may indicate a warning or critical status. In still other examples, a flashing or moving icon may indicate a warning or critical status.

In some embodiments, the health check system provides the first status indicator 502 identifying the normal status 504 on determining all parameters pass during the health check. The health check system changes the first status indicator 502 to the second status indicator 506 identifying the warning status 508 in response to a single warning. The warning status 508 indicates that the user associated with the client should check the computing system for the warnings indicated in the health check application. The status indicator is changed from the warning status 508 to the third status indicator 510 showing the critical status 512 in response to the health check analysis indicating an error or other failure associated with one or more components of the computing system.

Figure 6:
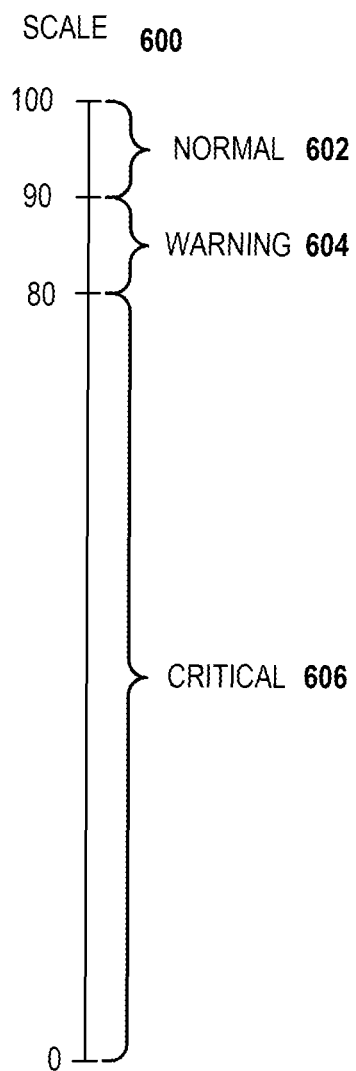
FIG. 6 is a block diagram illustrating a health check performance scale.

FIG. 6 is a block diagram illustrating a health check scoring scale. A health score is a score that ranks the health of a computing system on a scale, such as scale 600. The score indicates the health relative to the possible range of scores on the scale 600. In this example, the scale 600 includes a scale from zero (0) to one hundred (100).

In this non-limiting example, a range of ninety (90) to one hundred (100) falls within normal 602 range. A score falling within the range from eighty (80) to eighty-nine (89) is a score within warning 604 range. A score on the scale from zero to seventy-nine (79) is a score within critical 606 range.

However, in other examples, the range of scores on the scale 600 indicating the normal 602, warning 604, and the critical 606 ranges are different. For example, the normal 602 range may be a range from ninety-five (95) to one hundred and the warning range may be a range from eighty (80) to ninety-four (94), or any other selected range.

In other examples, the scale 600 is not limited to a scale of one to one-hundred. The scale 600 may be a scale having any range of scores. For example, the scale 600 may include a range of zero to one thousand (1000), a range of five hundred (500) to one thousand (1000), a range of one (1) to ten (10), a range of one (1) to five (5), or any other range of possible health scores.

Figure 7:
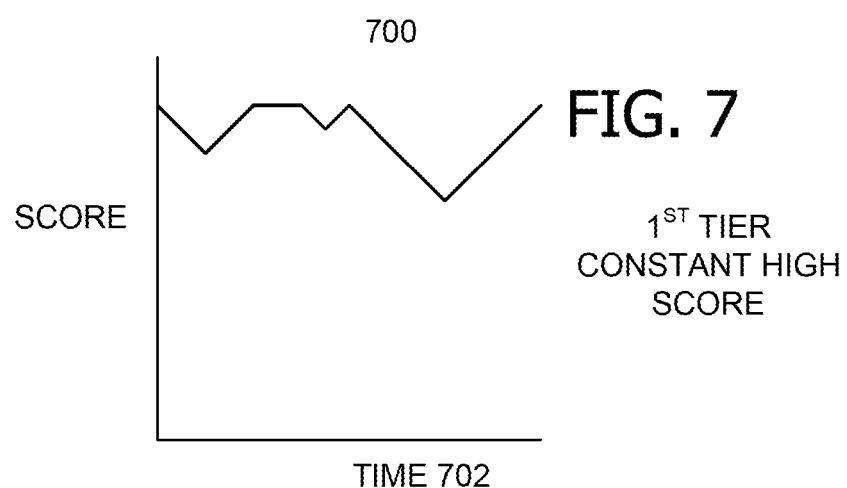
FIG. 7 is a block diagram illustrating a health graph associated with a first tier.

FIG. 7 is a block diagram illustrating a health graph associated with a first tier. The health check server charts periodic collections of scores in a time versus score graph to form a health graph for a particular computing device, computing system, data storage system, or data center, such as health graph 700. The time 702 refers to the date and/or time of day that the respective score was generated.

The health graph 700 in this example charts a set of two or more previous health scores for a computing system with relatively constant high health scores. In other words, the health scores for this computing system are typically within the normal range. These scores indicate the computing system shows resilient and reliable behavior.

The health graph 700 is analyzed to identify a health status of the computing system over time. In other words, the computing system may have a current health status as well as a "global" health status that indicates overall health status of the system over a user selected period of time. In this non-limiting example, analysis of graph 700 indicates the computing system has a first (1') tier status. Systems having a first tier status provide a desirable or optimal model for other systems to follow because they would generate the most reliable and efficient systems requiring less maintenance, fewer replacement components, and/or less frequent upgrades.

Figure 8:
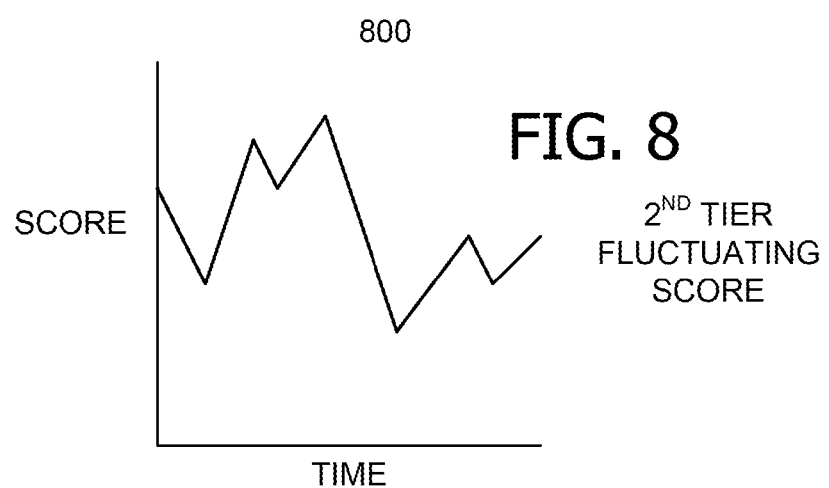
FIG. 8 is a block diagram illustrating a health graph associated with a second tier.

FIG. 8 is a block diagram illustrating a health graph associated with a second tier. Graph 800 is a health graph for a computing system or data center. The graph 800 in this non-limiting example illustrates a computing system with a health score that fluctuates between normal, warning, and critical range scores. These scores indicate the computing system requires extra development, maintenance cost, and/or more frequent upgrades.

In this example, analysis of graph 800 indicates that the computing system has a second ($2^{nd}$) tier status. Systems having a second tier status are typically functioning systems that require some extra maintenance due to some problematic performance or behavior, either technical or due to market changes. These systems are seen to periodically drop down to the critical score range.

Figure 9:
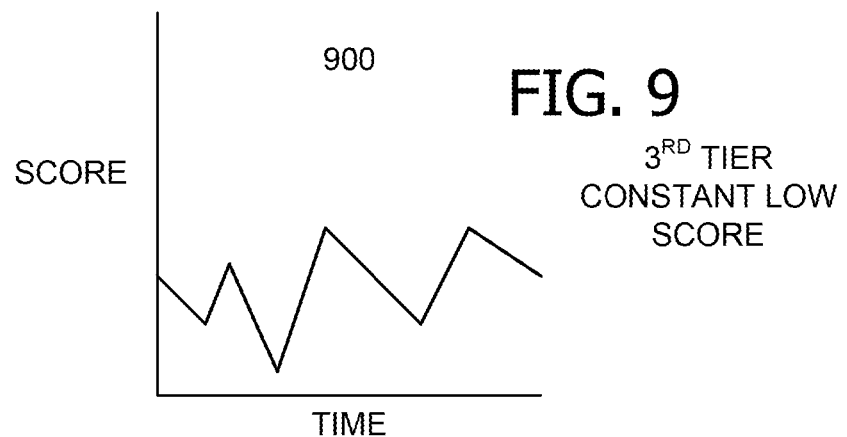
FIG. 9 is a block diagram illustrating a health graph associated with a third tier.

FIG. 9 is a block diagram illustrating a health graph associated with a third tier. Graph 900 is a health graph for a computing system, data storage array, or data center. In some examples, the health graph for one or more data storage array(s) may be referred to as an array health graph. In other examples, the health graph for one or more computing system(s) may be referred to as a system health graph.

The graph 900 in this non-limiting example illustrates a computing system having health scores that are frequently low health scores that frequently are in the critical range. These low/critical health scores may indicate systems which could not be fixed or a decision was made to not fix them.

In this example, an analysis of graph 900 indicates that the computing system has a third ($3^{rd}$) tier status. Systems in the third tier are functioning systems that have greater maintenance requirements, higher maintenance costs, and/or a higher chance of being deprecated before paying off their development costs. These system scores fluctuate between the warning range and critical range before eventually reaching their end of life cycle.

Figure 10:
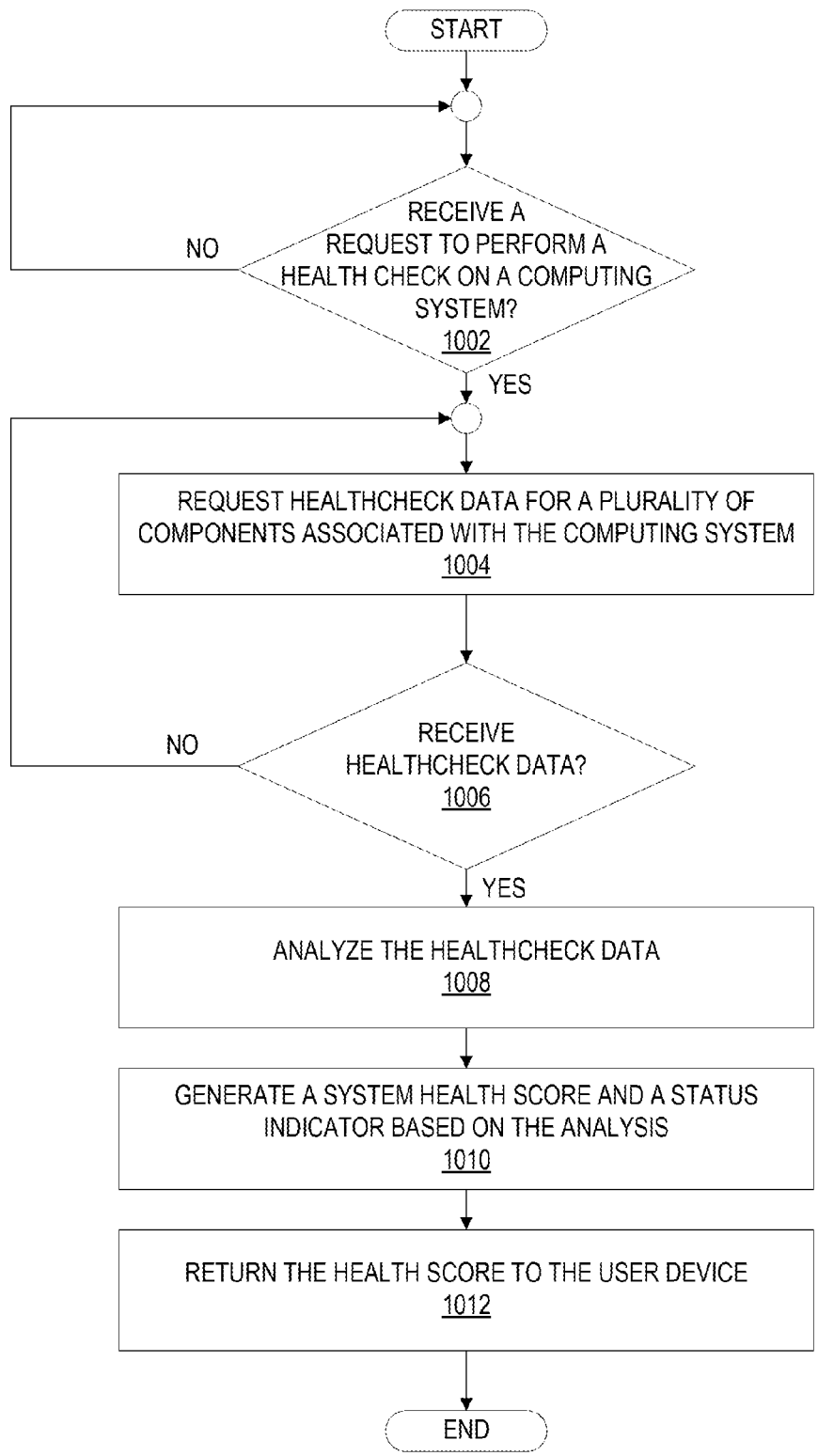
FIG. 10 is an exemplary flowchart illustrating generation of a health check score.

FIG. 10 is an exemplary flowchart illustrating generation of a health check score. The process shown in FIG. 10 may be implemented by a computing device, such as, but without limitation, server 120 in FIG. 1, health check server 202 in FIG. 2, or server 304 in FIG. 4.

The process begins by receiving a request to perform a health check on a computing system at 1002. The process requests performance data for a plurality of components associated with the computing system at 1004.

The process determines whether health check data is received at 1006. If no, the process returns to 1004. If health check data is received at 1006, the process analyzes the health check data at 1008. The process generates a system health score and a status indicator based on the analysis at 1010. The health score is returned to the user device at 1012. The process terminates thereafter.

While the operations illustrated in FIG. 10 are described as being performed by a computing device, such as, server 120 in FIG. 1, health check server 202 in FIG. 2, or server 304 in FIG. 4, aspects of the disclosure contemplate that performance of the operations by other entities. For example, a cloud service may perform one or more of the operations.

In the example shown in FIG. 10, the health check process is initiated when a request to perform a health check is received. However, in other examples, the health check process engages or initiates automatically without receiving a request to perform the health check. In these examples, the health check process requests the health check data from the computing system upon the occurrence of an event, such as a predetermined period of time.

In other examples, the health check process begins the health check process automatically on receiving the health check data from the computing system. In these examples, the computing system automatically sends the health check data to the health check server on the occurrence of a predetermined event, such as, but without limitation, a predetermined time interval, a date and/or time, or other event.

Figure 11:
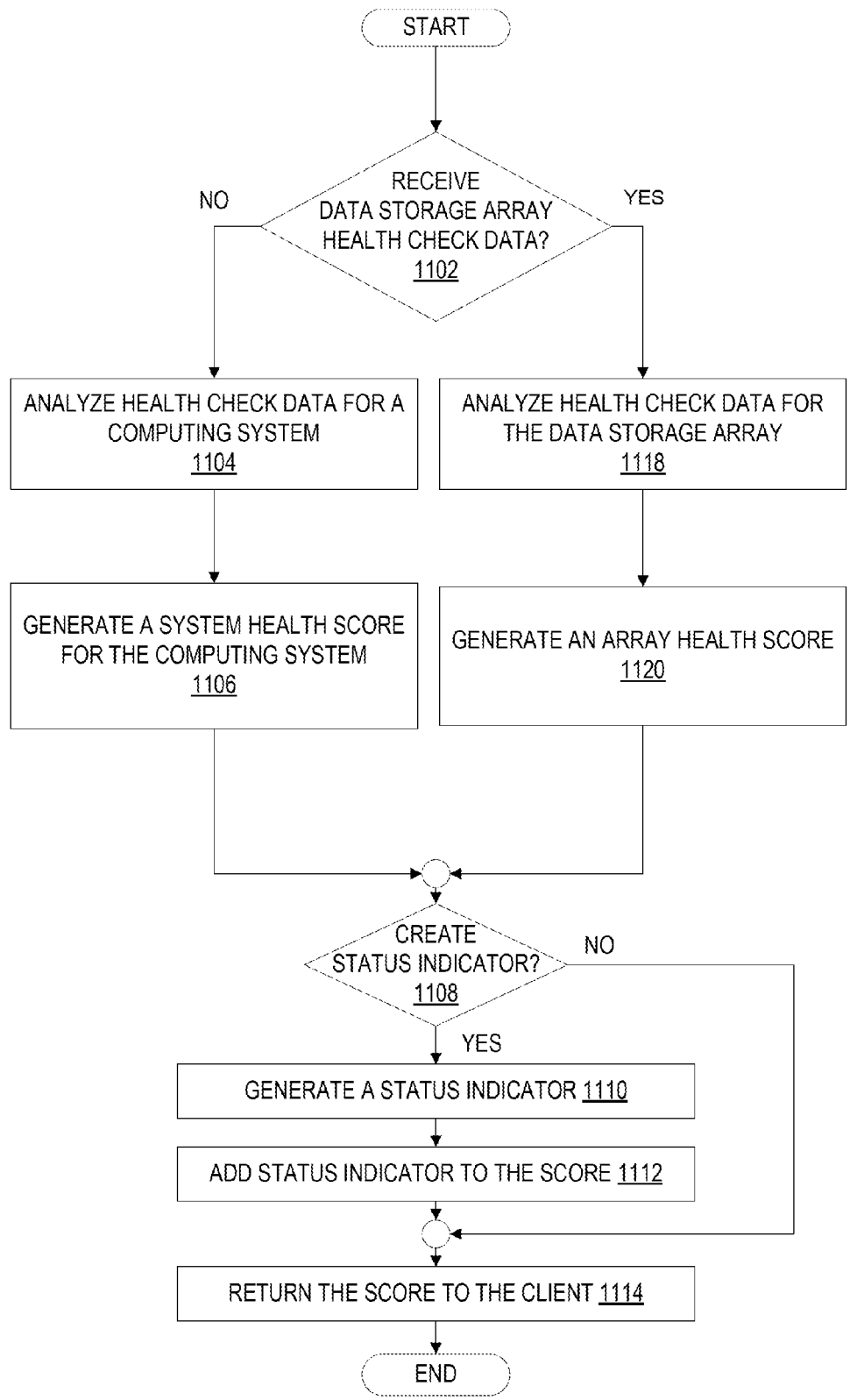
FIG. 11 is an exemplary flowchart illustrating generation of a health check score including a status indicator.

FIG. 11 is an exemplary flowchart illustrating generation of a health check score including a status indicator. The process shown in FIG. 11 may be implemented by a computing device, such as, but without limitation, server 120 in FIG. 1, health check server 202 in FIG. 2, or server 304 in FIG. 4.

The process begins by determining whether health check data is received for a data storage array at 1002. If no, the process analyzes the health check data for a computing system at 1104. The process generates a system health score based on the analysis at 1106.

The process determines whether a status indicator is to be created at 1108. If yes, a status indicator is generated at 1110. The process adds the status indicator to the score at 1112. The score is returned to the client at 1114. The process terminates thereafter.

Returning to 1102, on determining health check data for a data storage array is received, the process analyzes the health check data for the data storage array at 1118. The phrase "on determining" refers to making a determination, verifying, identifying or otherwise confirming receipt of the health check data.

The process generates an array health score based on the analysis at 1120. The process determines whether a status indicator is to be created for the data storage array at 1108. If no, the score is returned to the client at 1114. The process terminates thereafter.

Returning to 1108, if a status indicator is to be created, the process generates the status indicator at 1110. The process adds the status indicator to the score at 1112. The process returns the score for the data storage array to the client 1114. The process terminates thereafter.

While the operations illustrated in FIG. 11 are described as being performed by a computing device, such as, server 120 in FIG. 1, health check server 202 in FIG. 2, or server 304 in FIG. 4, aspects of the disclosure contemplate that performance of the operations by other entities. For example, a cloud service may perform one or more of the operations.

Figure 12:
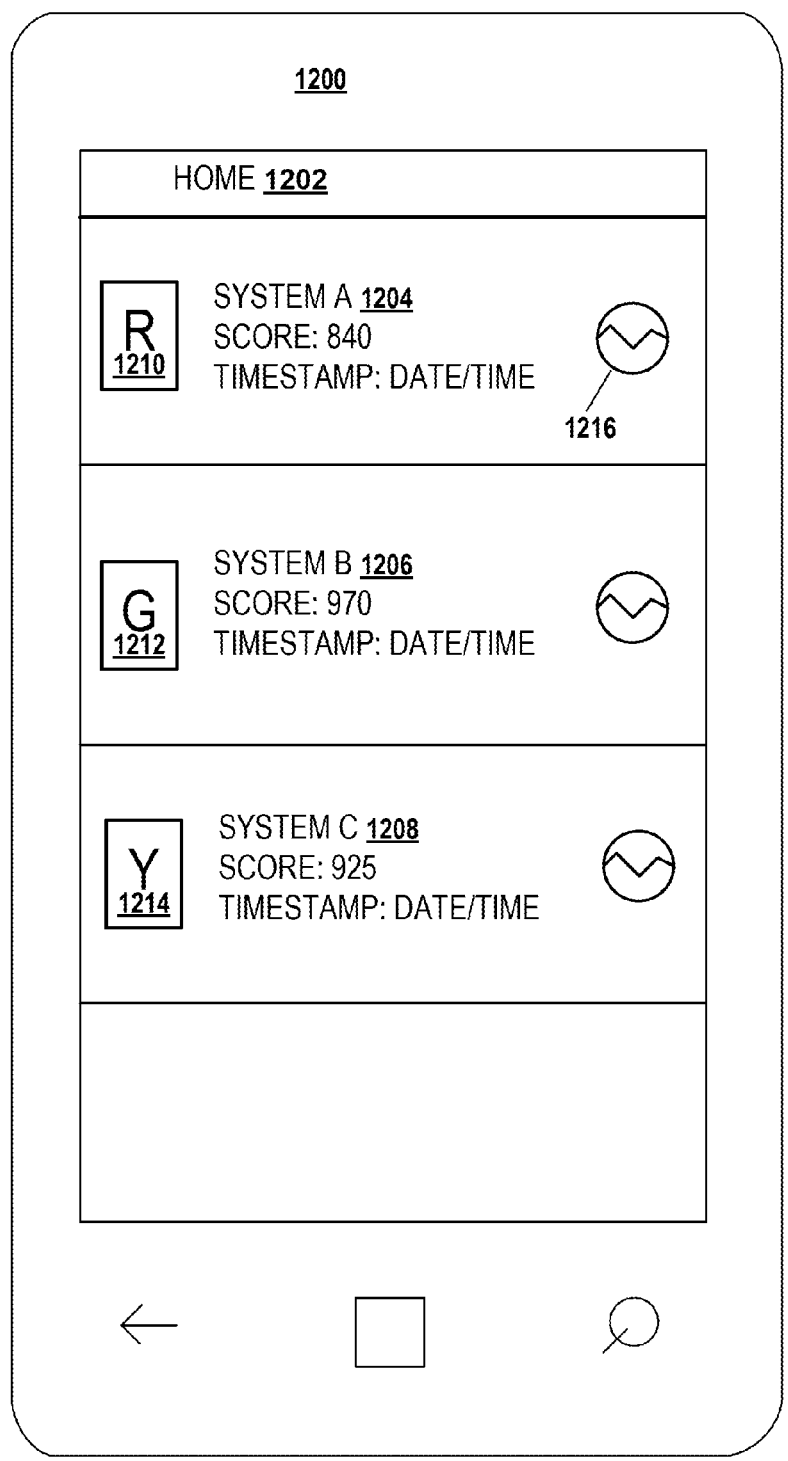
FIG. 12 is an exemplary block diagram illustrating a system health check results page.

FIG. 12 is an exemplary flowchart illustrating a system health check results page. The health check application running on the mobile client displays the health of a computing system in the form of a score and/or a status indicator. A user device 1200 in this example is a mobile computing device, such as, but without limitation, a smart phone, a tablet, or any other mobile computing device.

The home screen 1202 in this example shows different data storage arrays associated with a data center. The data storage arrays are identified in a list of systems being monitored. The list in this example includes system A 1204, system B 1206, and system C 1208. In other examples, the home screen may include only a single computing system. In still other examples, the home screen 1202 may include two or more systems in the list.

Each system being monitored by the health check system is displayed to a user associated with the user device 1200 with a score and/or a status indicator. For example, system A 1204 is displayed with a score of 840 and a status indicator 1210 indicating that the status is red or critical. System B has a score of 970 and a green status indicator 1212 indicating the status of system B is normal. System C 1208 has a score of 925 and a yellow status indicator indicating a warning status.

Each status indicator and score is optionally displayed to the user with a data and/or time. The date and/or time may include a day, month, year, and/or time at which the score and status were generated by the health check server.

The score optionally includes a health history for the data storage array. In this example, a user clicks or otherwise selects a health history icon 1216 for a particular data storage array to view the health history.

In some examples, a user may click on a system name or an icon to initiate a new health check on a given computing system. For example, the user could click on system A 1204 or an icon such as icon 1216 to initiate the new health check. In response, the health check system returns a new health check score and status indicator showing a current status of system A.

Figure 13:
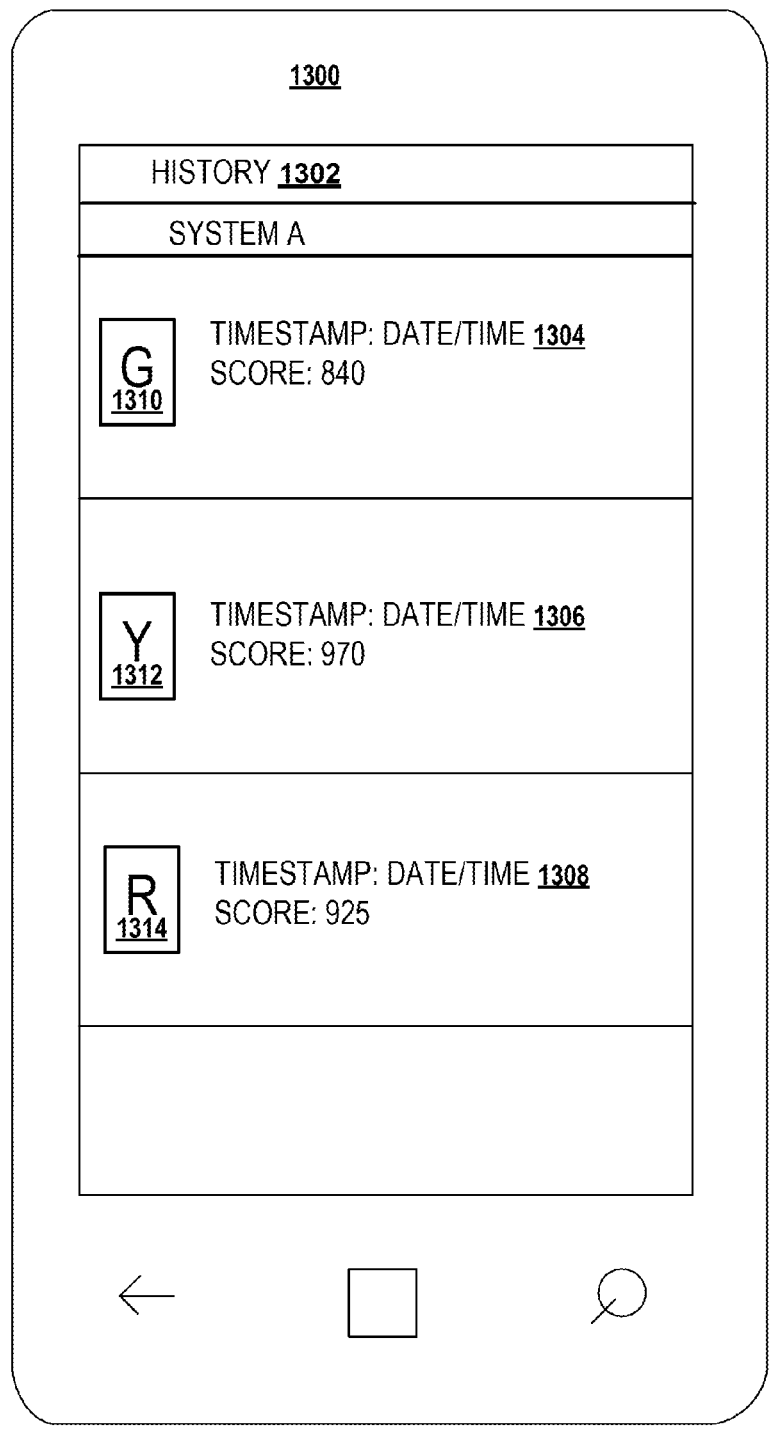
FIG. 13 is an exemplary block diagram illustrating a health history page.

FIG. 13 is an exemplary flowchart illustrating a health history page. The health history page 1300 provides a health history 1302 for a computing device. The health history 1302 includes a set of one or more previous system health scores. In one non-limiting example, the health history 1302 includes all previous health checks performed for a given computing device. However, in other examples, the health history 1302 only includes some of the previous health scores. For example, the health history 1302 may only include the health scores generated within a user selected time period, such as health scores generated during the last six months or health scores generated within the previous year.

The health history 1302 in this example includes a list of previous scores and status indicators. Each previous score includes a timestamp identifying the date and/or time each score and status indicator was generated. The time stamp may include the time in hours, minutes and seconds.

In this non-limiting example, the score for system A created at the first timestamp 1304 is a green status indicator 1310 identifying a normal status. The status indicator 1312 associated with the second score at timestamp 1306 is yellow indicating that the status has declined to the warning level. The status indicator 1314 associated with the third score at timestamp 1308 indicates that the score has further declined to the red/critical level.

Figure 14:
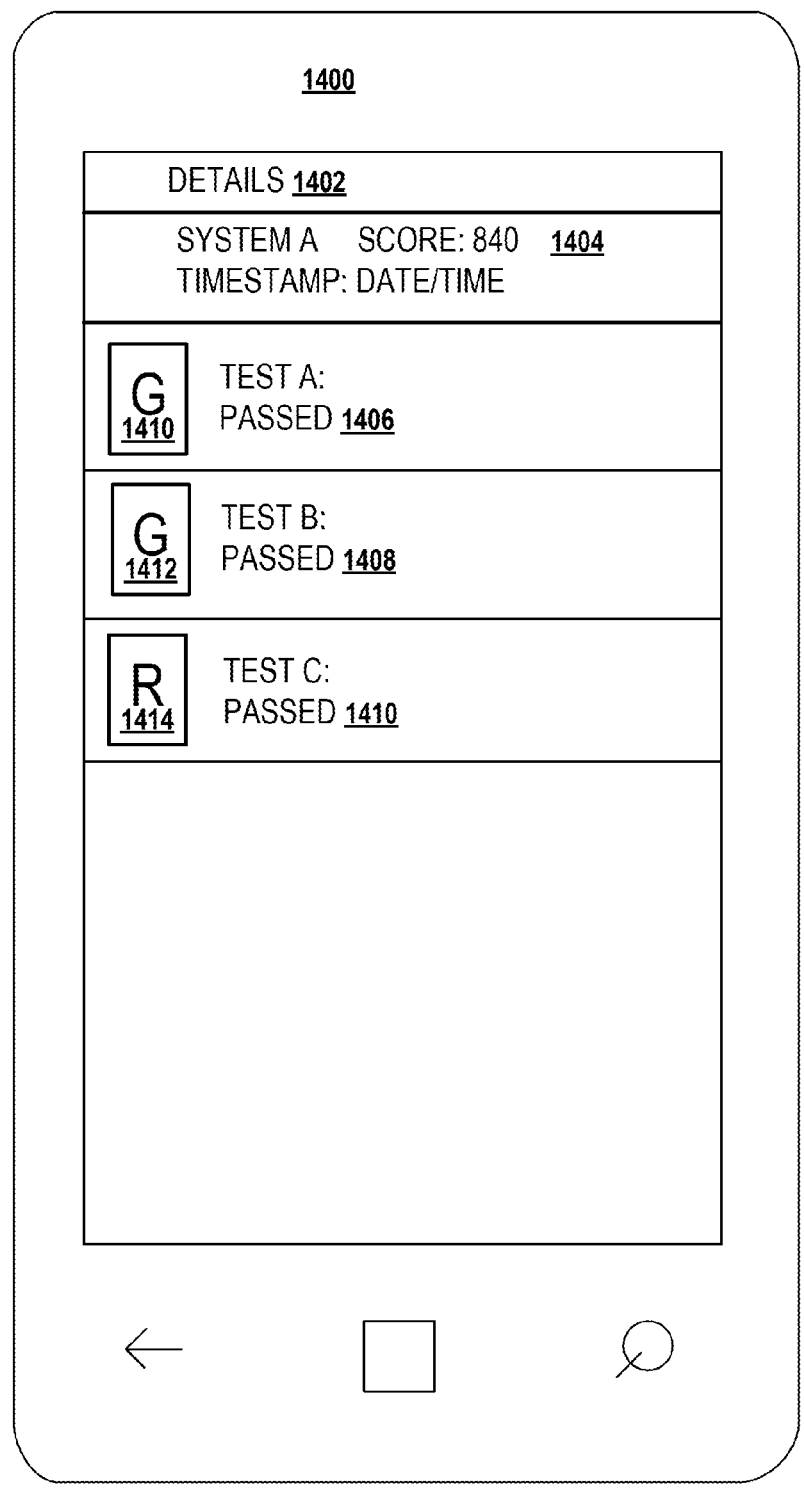
FIG. 14 is an exemplary block diagram illustrating a health check details page.

FIG. 14 is an exemplary block diagram illustrating a health check details page. The user device 1400 in this non-limiting example displays an array details page 1402. The array details page includes a set of parameters and a set of parameter status indicators. The set of parameters is a list of all tests applied during the health check analysis used to generate a given health score 1404 for the computing system A. In other words, the details page 1402 identifies analysis parameters for a particular health check score.

The set of parameter status indicators in this example includes an indicator for each parameter in the set of parameters. The parameter status indicator identifies whether a test associated with a particular parameter passed or failed during the analysis.

In some examples, the parameter status indicator may also include a warning status for the parameter. In these examples, a parameter status indicator includes a passed status, a failed status, and/or a warning status.

In this example, the parameters list includes green status indicator 1410 indicating Test A passed. Another green indicator 1412 indicates a passed status for Test B 1408. A red status indicator 1414 in this example indicates a failed Test C 1410.

The displays shown in FIG. 12, FIG. 13, and FIG. 14 are merely examples of possible display screens. The health check system of the examples is not limited to display screens having the exact configuration and/or appearance shown in the examples shown in FIG. 12, FIG. 13, and FIG. 14. A results display may include different icons, different arrangement of the icons on the display, a different number of systems, parameters, indicators, scores, and so forth.

At least a portion of the functionality of the various elements in FIG. 1 may be performed by other elements in FIG. 2, FIG. 3, FIG. 4, or an entity (e.g., processor, web service, server, application program, computing device, etc.) not shown within the figures.

In some examples, operations illustrated in FIG. 10 and FIG. 11 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se.

Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for generating a health check score and status indicator for a computing system. For example, the elements illustrated in FIG. 1, such as when encoded to perform the operations illustrated in FIG. 10 and FIG. 11, constitute exemplary means for creating health check scores and status indicators representing changing performance status of a computing system or data center.

More specifically, the health check server illustrated in FIG. 1, such as when encoded to perform the operations illustrated in FIG. 10 and FIG. 11, constitute exemplary means for receiving performance data from a computing system, exemplary means for analyzing the performance data, exemplary means for generating a health check score and a health status indicator, and exemplary means for sending the health check score and the health status indicator to the client for display to a user.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method executed by one or more processors, the method comprising:
    on receiving health check data associated with a computing system from a user device, analyzing the health check data, by an analysis engine of a health check server, the health check data comprising performance data for a plurality of components associated with the computing system;
    generating, by the one or more processors, a system health score and a status indicator for the computing system based on the analysis of the health check data, the system health score ranking performance of the computing system based on a scale, the status indicator indicating a health status of the computing system;
    returning the generated system health score and the status indicator to a user device for display to a user;
    generating a recommendation comprising a recommended action to be taken by the user with regard to the computing system;
    returning the recommendation with the system health score to the user device;
    predicting a future health score for the computing system if the user performs the recommended action with regard to the computing system;
    returning the predicted future health score with the recommendation to the user device, wherein the system health score further comprises a set of parameters and a set of parameter status indicators; and
    returning the set of parameters and the set of parameter status indicators with the system health score to the user device, wherein a parameter in the set of parameters comprises an identification of an analysis parameter, wherein a parameter status indicator identifies a status of a given parameter, and wherein the status of the given parameter comprises a passed status or a failed status.

2. The computer-implemented method of claim 1, wherein a first status indicator identifies a normal status, a second status indicator identifies a warning status, and a third status indicator identifies a critical status of the computing system.

3. The computer-implemented method of claim 1, wherein the computing system is a data storage system, the data storage system comprising a set of data storage arrays, and further comprising:
    analyzing the health check data associated with the set of data storage arrays to generate at least one array health score, an array health score ranking performance of a given data storage array based on the scale; and
    returning the at least one array health score to the user device, wherein the at least one array health score comprises a score for at least one of the data storage arrays.

4. The computer-implemented method of claim 1, further comprising:
    retrieving a set of previous system health scores, the set of previous system health scores forming a health history for the computing system; and
    returning the health history to the user device.

5. The computer-implemented method of claim 1, further comprising:
    identifying at least one score based incentive associated with improving the system health score or receiving system health scores within a particular range of scores; and
    returning the at least one score based incentive to the user device.

6. The computer-implemented method of claim 1, further comprising:
    retrieving a set of previous system health scores for the computing system;
    charting the set of previous system health scores over time to form a health graph; and
    analyzing the health graph to identify a health status over time, wherein the health status comprises a first tier status, a second tier status, or a third tier status.

7. One or more computer storage media embodying computer executable components, said components comprising an analysis engine that, when executed, cause at least one processor to:
    receive health check data for a plurality of components associated with a data center, the health check data comprising configuration data associated with the plurality of components;
    analyze the health check data based on a set of parameters;
    generate a status indicator identifying a current health status for the data center based on the analysis of the health check data, the status indicator comprising a first status indicator identifying a normal status, a second status indicator identifying a warning status, or a third status indicator identifying a critical status;
    automatically return the status indicator to a user device for display to a user associated with the user device;
    generate a recommendation comprising a recommended action to be taken by the user with regard to at least one data storage array associated with the data center;
    predict a future health score for the data center if the recommended action is taken;
    return the recommendation and the predicted future health score to the user device for display to the user, wherein a system health score comprises a set of parameters and a set of parameter status indicators; and
    return the set of parameters and the set of parameter status indicators with the system health score to the user device, wherein a parameter in the set of parameters comprises an identification of an analysis parameter, wherein a parameter status indicator identifies a status of a given parameter, and wherein the status of the given parameter comprises a passed status or a failed status.

8. The computer storage media of claim 7, wherein the first status indicator comprises a green color indicator identifying the normal status, wherein the second status indicator comprises a yellow color indicator identifying the warning status, and wherein the third status indicator comprises a red color indicator identifying the critical status.

9. The computer storage media of claim 7, wherein the analysis engine is further executed to cause the at least one processor to:
    generate a current health score for the data center based on analysis of the health check data, the current health score ranking performance of a set of computing systems on a performance scale.

10. The computer storage media of claim 7, wherein the analysis engine is further executed to cause the at least one processor to:
receive a set of previous health scores for the data center;
chart the set of previous health scores over time to form a health graph; and
analyze the health graph to identify a data center health status over time, wherein the status over time comprises a first tier status, a second tier status, or a third tier status.

11. A server comprising:
an application programming interface (API) configured to receive a request from a client to perform a health check on a data storage array;
at least one processor; and
a memory area, the memory area storing an analysis engine component, the at least one processor executing the analysis engine component to:
receive health check data associated with the data storage array from a host component, the health check data comprising configuration data and performance data associated with the data storage array;
generate an array health score for the data storage array based on analysis of the health check data, the array health score ranking performance of the data storage array relative to a performance scale;
return the array health score to the client for display to a user associated with the client;
generate a recommendation comprising a recommended action to be taken by the user with regard to the data storage array;
predict a future health score for the data storage array if the recommended action is taken;
return the recommendation and the predicted future health score to the client for display to the user, wherein a system health score comprises a set of parameters and a set of parameter status indicators; and
return the set of parameters and the set of parameter status indicators with the system health score to the user, wherein a parameter in the set of parameters comprises an identification of an analysis parameter, wherein a parameter status indicator identifies a status of a given parameter, and wherein the status of the given parameter comprises a passed status or a failed status.

12. The server of claim 11, wherein the array health score further comprises a status indicator identifying a current health status for the data storage array based on the analysis of the health check data, the status indicator comprising a first status indicator identifying a normal status, a second status indicator identifying a warning status, or a third status indicator identifying a critical status of the given data storage array.

13. The server of claim 11, further comprising:
a data structure, the data structure comprising a set of previous array health scores for the data storage array, the set of previous array health scores forming a health history for the data storage array, wherein the health history is returned to the client via the API.

14. The server of claim 11, wherein the API is a representational state transfer (REST) API.

15. The server of claim 11, wherein the API receives a request for the system health score associated with a data storage system, the data storage system comprising a plurality of data storage arrays, and wherein the at least one processor executes the analysis engine component to:
receive health check data associated with the plurality of data storage arrays of the data storage system; and
generate the system health score for the data storage system based on analysis of the health check data for the plurality of data storage arrays, the system health score ranking a current health status of the data storage system, and wherein the system health score is returned to the client via the API.

16. The server of claim 11, wherein the at least one processor further executes the analysis engine component to chart a set of previous array health scores over time to form an array health graph.

* * * * *